United States Patent
Moriyama (10) Patent No.: US 11,777,410 B2
(45) Date of Patent: Oct. 3, 2023

(54) POWER SUPPLY APPARATUS FOR STABILIZING POWER SUPPLY CAPABILITY OF AUXILIARY WINDING PROVIDED IN TRANSFORMER

(71) Applicant: CANON KABUSHIKI KAISHA, Tokyo (JP)

(72) Inventor: Takumi Moriyama, Ibaraki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 301 days.

(21) Appl. No.: 17/130,095

(22) Filed: Dec. 22, 2020

(65) Prior Publication Data

US 2021/0211056 A1 Jul. 8, 2021

(30) Foreign Application Priority Data

Jan. 6, 2020 (JP) .................................. 2020-000528

(51) Int. Cl.
  *H02M 3/335* (2006.01)
  *H02M 1/32* (2007.01)
  *G03G 15/00* (2006.01)
  *H02M 1/42* (2007.01)
  *H02M 1/14* (2006.01)

(52) U.S. Cl.
  CPC ............ *H02M 3/335* (2013.01); *G03G 15/80* (2013.01); *H02M 1/14* (2013.01); *H02M 1/32* (2013.01); *H02M 1/4208* (2013.01)

(58) Field of Classification Search
  None
  See application file for complete search history.

(56) References Cited

U.S. PATENT DOCUMENTS

| 10,971,999 | B2 | 4/2021 | Moriyama | |
| 2018/0358889 | A1* | 12/2018 | Moriyama | H02M 1/36 |
| 2019/0267902 | A1* | 8/2019 | Ueno | H02M 3/33523 |

FOREIGN PATENT DOCUMENTS

| JP | H11-032480 | 2/1999 |
| JP | 2000-125467 A | 4/2000 |
| JP | 2008-086134 A | 4/2008 |
| JP | 2018-126037 A | 8/2018 |
| JP | 2019-004541 | 1/2019 |

OTHER PUBLICATIONS

U.S. Appl. No. 17/123,256, filed Dec. 16, 2020 by Takumi Moriyama.
Japanese Office Action dated Jul. 28, 2023 during prosecution of related Japanese application No. 2020-000528 (English-langauge translation attached).

* cited by examiner

Primary Examiner — Jas A Sanghera
(74) Attorney, Agent, or Firm — VENABLE LLP (57) ABSTRACT

A protection circuit protects a rectifier circuit from an inrush current inputted to a smoothing circuit. A short-circuiting circuit does not short the protection circuit while an inrush current may occur, and shorts it while an inrush current does not occur. A transformer has a primary winding, a secondary winding and an auxiliary winding. A delay circuit delays a timing at which an operation of a load connected to the auxiliary winding is started with respect to a timing at which an operation of the short-circuiting circuit is started. A rectifying and smoothing circuit generates an output voltage by rectifying and smoothing the secondary side voltage. The short-circuiting circuit is driven by the output voltage.

17 Claims, 7 Drawing Sheets

POWER SUPPLY APPARATUS FOR STABILIZING POWER SUPPLY CAPABILITY OF AUXILIARY WINDING PROVIDED IN TRANSFORMER

BACKGROUND OF THE INVENTION

Field of the Invention

The present invention relates to a power supply apparatus for stabilizing a power supply capability of an auxiliary winding provided in a transformer.

Description of the Related Art

Generally, a power supply apparatus converts an input voltage to an output voltage by a transformer. There are also transformers with an auxiliary winding, in addition to a primary winding and secondary winding, among the transformers used in power supply apparatuses. Electric power generated by the auxiliary winding may be used to drive a load arranged on a primary side of the transformer (Japanese Patent Laid-Open No. 11-0032480 and US-2018-0358889).

The power supply capability of the auxiliary winding is proportional to the magnitude of the load connected to the secondary side of the transformer. Therefore, when a secondary side load is light, the power supply capability of the auxiliary winding is insufficient, and it is impossible to stably drive the primary side load connected to the auxiliary winding. To artificially increase the secondary side load, it is conceivable to provide a dummy resistor (bleeder resistor) in parallel to the secondary side load. However, this will likely introduce an increase in the number of parts and an increase in the cost of the power supply apparatus.

SUMMARY OF THE INVENTION

The present invention provides a power supply apparatus comprising the following elements. A rectifier circuit is configured to rectify alternating current inputted from an alternating power supply. A smoothing circuit is configured to smooth output of the rectifier circuit. A protection circuit is configured to protect the rectifier circuit from an inrush current inputted to the smoothing circuit. A short-circuiting circuit is configured to not short circuit the protection circuit in a period in which an inrush current may occur, and configured to short circuit the protection circuit in a period in which an inrush current does not occur. A transformer has a primary winding to which a primary side voltage generated by the smoothing circuit is applied, a secondary winding for generating a secondary side voltage corresponding to a predetermined winding ratio, and an auxiliary winding magnetically coupled to the primary winding. A delay circuit configured to delay a timing at which an operation of a load connected to the auxiliary winding is started with respect to an operation of a timing at which the short-circuiting circuit is started. A switching element is configured to switch a current that flows through the primary winding so that the secondary side voltage becomes a target voltage. A rectifying and smoothing circuit is configured to generate an output voltage by rectifying and smoothing the secondary side voltage. The short-circuiting circuit is driven by the output voltage.

Further features of the present invention will become apparent from the following description of exemplary embodiments (with reference to the attached drawings).

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
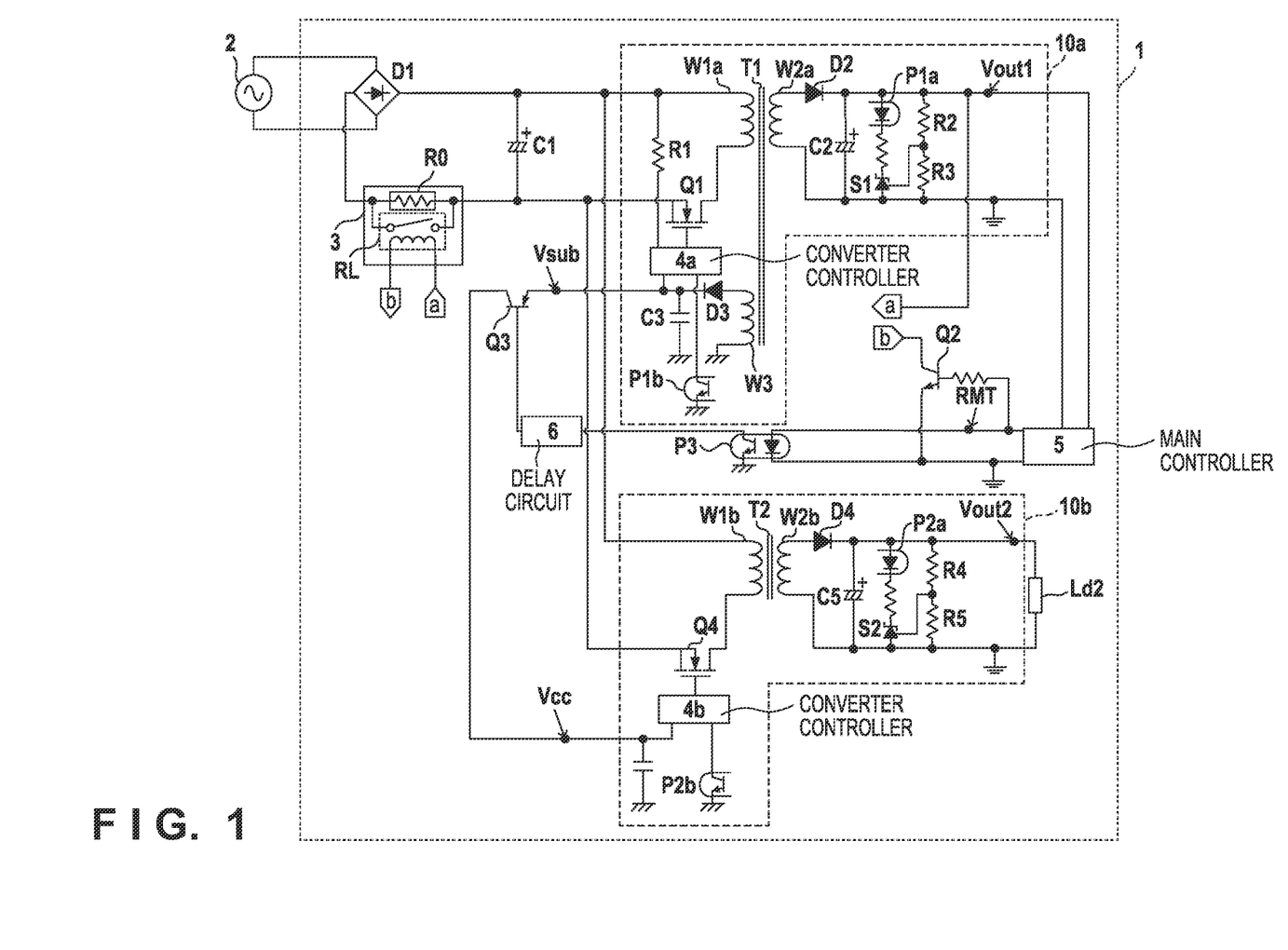
FIG. 1 is a circuit diagram of a power supply apparatus.

As shown in FIG. 1, a power supply apparatus 1 is an AC/DC converter for converting an alternating current voltage supplied from a commercial power supply 2 to a direct current voltage and outputting the result. The power supply apparatus 1 includes a first converter 10a and a second converter 10b. The power supply apparatus 1 may be employed, for example, as a power supply for supplying electric power to an image forming apparatus. An electric device such as an image forming apparatus has a normal power mode in which power consumption is large as in a state in which the device is operating, and a power saving mode in which the device is not operating and a part of the power supply is stopped and the power consumption is smaller than that in the normal power mode. Therefore, the first converter 10a may function as a sub power supply that operates in both power modes. The second converter 10b may be stopped in the power saving mode and function as a main power supply that operates in the normal power mode. Therefore, the first converter 10a always operates when the power supply apparatus 1 is connected to the commercial power supply 2, and supplies electric power to a main controller 5 which is for controlling an electric device. When the electric device is in the power saving mode, the second converter 10b is stopped. When the electric device is operating in the normal power mode, the second converter 10b receives a signal from the main controller 5 to start operation and supply the necessary electric power to the electric device.

AC/DC Converter

The power supply apparatus 1 has an AC/DC converter that converts an alternating current voltage to a direct current voltage. A diode bridge D1 provided in the AC/DC converter functions as a rectifier circuit (rectifier or rectifier element) for rectifying the alternating current. A capacitor C1 is an electrolytic capacitor or the like, and functions as a smoothing circuit (smoothing element) for smoothing the output current (pulsating current) of the diode bridge D1. By the pulsating current flowing into the capacitor C1, the capacitor C1 is charged. When the alternating current voltage is inputted to the power supply apparatus 1 in a state where the end-to-end voltage across the capacitor C1 is low, a large current (inrush current) can flow from the commercial power supply 2 to the capacitor C1. Therefore, a current limiting element R0 is provided between the diode bridge D1 and the capacitor C1. A large current (inrush current) flowing into the capacitor C1 is limited by the current limiting element R0. Thus, a fuse (not shown) provided on the diode bridge D1 and its front stage is protected. The current limiting element R0, for example, may be a resistance element or a thermistor.

Incidentally, the current limiting element R0 functions at least in a period in which an inrush current is likely to occur, such as a period immediately after alternating current voltage is inputted to the power supply apparatus 1 (charging period of the capacitor C1). However, in the period in which the inrush current will not occur, since the current limiting element R0 consumes electric power, the efficiency of the power supply apparatus 1 is reduced. Therefore, in the period in which the inrush current is not generated, a relay RL short circuits the current limiting element R0. The current limiting element R0 (protection circuit) and the relay RL (a short-circuiting circuit) forms an inrush current reduction circuit 3.

First Converter

To the subsequent stage of the capacitor C1, the first converter 10a and the second converter 10b are connected. The first converter 10a is a DC/DC converter.

In the first converter 10a, the direct current voltage generated by the diode bridge D1 and the capacitor C1 is supplied to a converter controller 4a through a start-up resistor R1. The converter controller 4a is a control circuit for controlling an output voltage Vout1 of the first converter 10a to a target voltage.

One end of the capacitor C1 is connected to one end of a primary winding W1a of a transformer T1. The other end of the capacitor C1 is connected to the source of a switching element Q1 (FET). The drain of the switching element Q1 is connected to the other end of the primary winding W1a. The gate of the switching element Q1 is connected to the converter controller 4a. The converter controller 4a, which is started up by charging the capacitor C1 with a predetermined voltage, starts outputting a switching signal to the gate of the switching element Q1. By switching the input voltage applied to the primary winding W1a by the switching element Q1, an alternating current flows through the primary winding W1a. By this alternating current, an alternating current voltage corresponding to the winding ratio of the transformer T1 is generated in a secondary winding W2a. A diode D2 and a capacitor C2 are disposed on the secondary side of the first converter 10a. The diode D2 functions as a rectifier circuit that rectifies the alternating current generated in the secondary winding W2a to generate a pulsating current. The capacitor C2 smoothes the pulsating current output from the diode D2 to generate a direct current. The end-to-end voltage across the capacitor C2 is the output voltage Vout1 of the first converter 10a.

Resistors R2, R3, shunt regulator S1 and a photocoupler form a feedback circuit that feeds back the output voltage Vout1 to the converter controller 4a. The photocoupler is configured by a light emitting diode P1a and a phototransistor P1b, and insulates the primary side and the secondary side of the first converter 10a (the transformer T1). Resistors R2 and R3 divide the output voltage Vout1, and form a voltage-dividing circuit for generating a detected voltage proportional to the output voltage Vout1. The detected voltage is inputted to the shunt regulator S1. When the detected voltage is higher than the reference voltage, the shunt regulator S1 increases the current flowing through the light emitting diode P1a. However, when the detected voltage is lower than the reference voltage, the shunt regulator S1 decreases the current flowing through the light emitting diode P1a. When a current flows through the light emitting diode P1a, the light emitting diode P1a emits light. A current corresponding to the amount of light of the light emitting diode P1a flows through the phototransistor P1b. Thus the output voltage Vout1 of the first converter 10a is fed back to the converter controller 4a via a photocoupler. The converter controller 4a controls a duty ratio of the switching signal supplied to the switching element Q1 so that the output voltage Vout1 of the first converter 10a becomes the target voltage. The switching element Q1 may be, for example, a MOSFET. If the output voltage Vout1 of the first converter 10a is lower than the target voltage, more electric power needs to be supplied to the secondary side of the transformer T1. Therefore, the converter controller 4a increases the period during which the switching element Q1 is turned on, and the current flowing through the primary winding W1a of the transformer T1 increases. An auxiliary winding W3 is wound around the same core as the primary winding W1a and the secondary winding W2a of the transformer. Voltage is also generated in the auxiliary winding W3 at the same time the switching of the switching element Q1 is started. Current flows through a diode D3 by this voltage, and a capacitor C3 is charged. In other words, a direct current voltage is generated at both ends of the capacitor C3. The power supply source across the capacitor C3 serves as an end-to-end voltage for the converter controller 4a. When adequate direct current voltage is provided from the capacitor C3 to the converter controller 4a, the converter controller 4a disconnects the electric power that had been supplied through the start-up resistor R1. Thus, since no current flows in the start-up resistor R1, power consumption reduction is achieved.

Electric power generated by the auxiliary winding W3 is also supplied to a converter controller 4b of the second converter 10b via a switch Q3. When the electric device operates in the normal power mode, the main controller 5 outputs an ON signal to the switch Q3 via a photocoupler P3. The switch Q3 may be a semiconductor switch such as a transistor.

When the switch Q3 is turned from OFF to ON, the voltage Vsub generated by the auxiliary winding W3, the diode D3 and the capacitor C3 as the power supply voltage Vcc, is supplied to the converter controller 4b. Thus, switching of a switching element Q4 is started, and an output voltage Vout2 is generated on the secondary side of the second converter 10b.

The ON signal output by the main controller 5 further switches a switch Q2 from OFF to ON. Thus, the output voltage Vout1 is applied to the relay RL, the current limiting element R0 is short circuited. The switch Q2 may be a semiconductor switch such as a transistor.

Second Converter

The second converter 10b is a DC/DC converter for converting the direct current voltage generated by the capacitor C1 to the output voltage Vout2. The converter controller 4b is a control circuit for controlling the output voltage Vout2 of the second converter 10b to a target voltage.

One end of the capacitor C1 is connected to one end of a primary winding W1b of a transformer T2 of the second converter 10b. The other end of the capacitor C1 is connected to the source of the switching element Q4 of the second converter 10b. The drain of the switching element Q4 is connected to the other end of the primary winding W1b. The gate of the switching element Q4 is connected to the converter controller 4b. The converter controller 4b started up by the completion of charging the capacitor C3 and the main controller 5 outputting the on signal starts outputting a switching signal to the gate of the switching element Q4. By switching the input voltage applied to a primary winding W1b by the switching element Q4, an alternating current flows through the primary winding W1b. By this alternating current, an alternating current voltage corresponding to the winding ratio of a transformer T2 is generated in a secondary winding W2b. A diode D4 and a capacitor C5 are disposed on the secondary side of the second converter 10b. The diode D4 functions as a rectifier circuit that rectifies the alternating current generated in the secondary winding W2b to generate a pulsating current. The capacitor C5 smoothes the pulsating current output from the diode D4 to generate a direct current. The end-to-end voltage across the capacitor C5 is the output voltage Vout2 of the second converter 10b.

Resistors R4, R5, shunt regulator S2 and a photocoupler form a feedback circuit that feeds back the output voltage Vout2 to the converter controller 4b. The photocoupler is configured by a light emitting diode P2a and a phototransistor P2b, and insulates the primary side and the secondary side of the second converter 10b. Resistors R4 and R5 divide the output voltage Vout2, and form a voltage-dividing circuit for generating a detected voltage proportional to the output voltage Vout2. When the detected voltage is higher than the reference voltage, the shunt regulator S2 increases the current flowing through the light emitting diode P2a. However, when the detected voltage is lower than the reference voltage, the shunt regulator S2 decreases the current flowing through the light emitting diode P2a. When a current flows through the light emitting diode P2a, the light emitting diode P2a emits light. A current corresponding to the amount of light of the light emitting diode P2a flows through the phototransistor P2b. Thus the output voltage Vout2 of the second converter 10b is fed back to the converter controller 4b via a photocoupler. The converter controller 4b controls a duty ratio of the switching signal supplied to the switching element Q4 so that the output voltage Vout2 of the second converter 10b becomes the target voltage. If the output voltage Vout2 of the second converter 10b is lower than the target voltage, more electric power needs to be supplied to the secondary side of the transformer T2. Therefore, the period during which the switching element Q4 is turned on is increased, and the current flowing through the primary winding W2b of the transformer T2 increases. A load Ld2 is connected to the second converter 10b.

Increase in the Secondary Side Load of the First Converter 10a and the Function of a Delay Circuit 6

As a characteristic of a transformer, the load arranged on the secondary side of the first converter 10a and the power supply capability of the auxiliary winding W3 are proportional. If the secondary side load is light, the duty ratio of the switching element Q1 required to maintain the output voltage Vout1 becomes small. Therefore, it is harder for electric power to be supplied to the auxiliary winding W3. If the secondary side load of the first converter 10a is light, the power supply capability of the auxiliary winding W3 is insufficient, the second converter 10b cannot operate, or may repeatedly start up and stop. Therefore, in the first embodiment, in order to increase the secondary side load of the first converter 10a, the relay RL of the inrush current reduction circuit 3 is driven by the output voltage Vout1. This increases the power supply capability of the auxiliary winding W3. Also, in order to more stably operate the second converter 10b, the operation start timing of the converter controller 4b may be delayed by the delay circuit 6.

Figure 2:
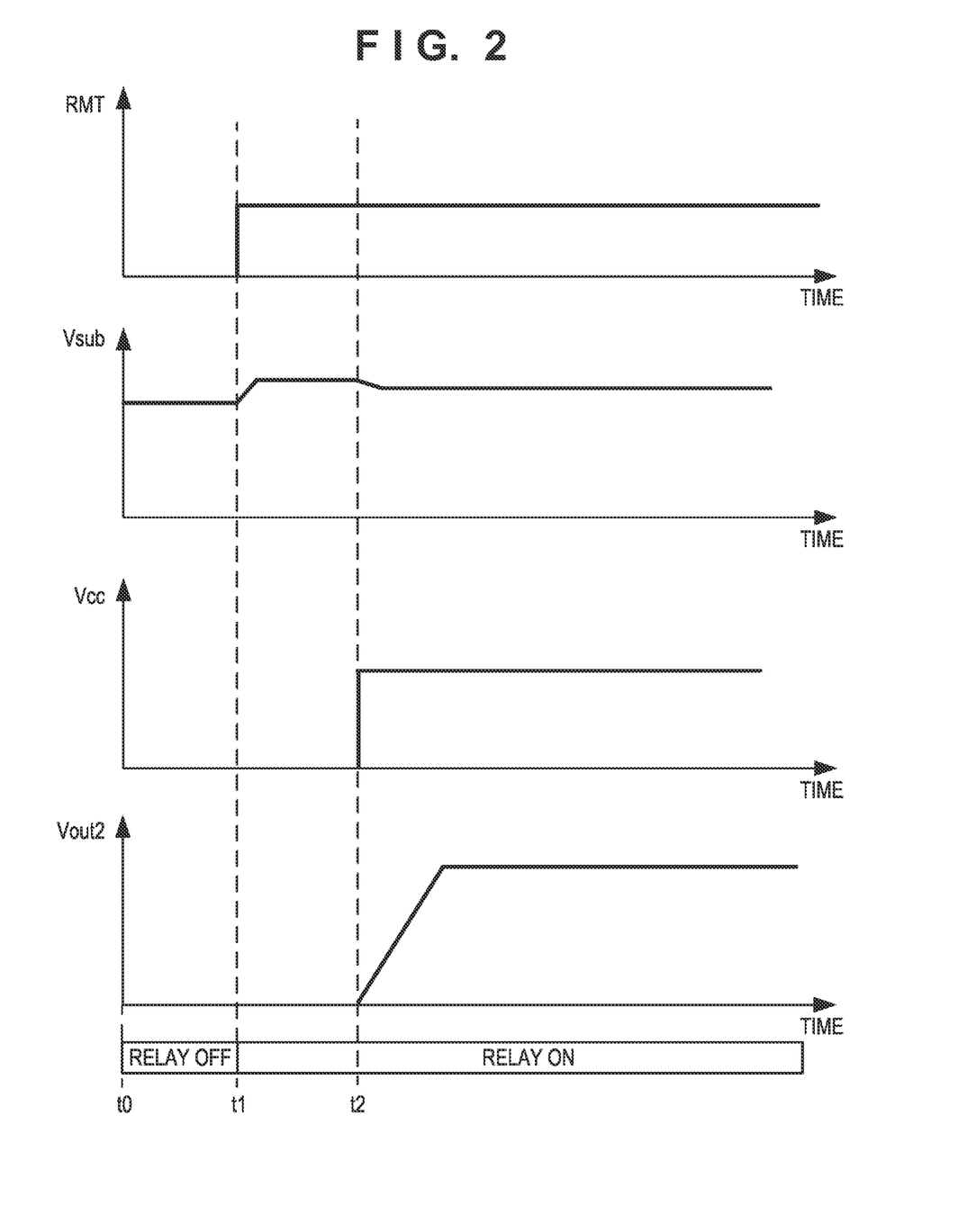
FIG. 2 is a timing chart illustrating voltage and signal change.

Details of the power supply apparatus 1 of the first embodiment will be described with reference to a timing chart of FIG. 2. In FIG. 2, RMT is an ON signal of the switch Q3 (Q2) described above, and may be referred to herein as the operation start signal. Vsub is the voltage generated by the auxiliary winding W3. Vcc is the power supply voltage of the converter controller 4b. Vout2 is the output voltage of the second converter 10b.

At time t0, the commercial power supply 2 is already inputting an alternating current voltage to the power supply apparatus 1. Therefore, the first converter 10a outputs the output voltage Vout1. However, the electric device, which is the load Ld2 of the second converter 10b, is operating in the power saving mode. Therefore, the second converter 10b is stopped. Relay RL is also stopped (disconnected) to improve the standby power in the power saving mode. When the electric device is in the power saving mode, the input current to the power supply apparatus 1 is low. Therefore, less electric power is consumed by the current limiting element R0. Considering the electric power consumed by the relay RL, the standby power can be improved by disconnecting the relay RL when the electric device is in the power saving mode. This is because the electric power consumed by the relay RL may be more than the electric power consumed by the current limiting element R0. Therefore, the relay RL is disconnected in the power saving mode. When the electric device transitions from the power saving mode to the normal power mode, the second converter 10b starts to operate. At this time, the electric power consumed by the relay RL becomes less than the electric power consumed by the current limiting element R0. In order to reduce loss at the current limiting element R0, the relay RL is electrically connected. Therefore, an external signal for switching the operation and stoppage of the second converter 10b, and an external signal for switching the electrical connection and disconnection of the relay RL can both be by the same signal.

At time t1, the electric device starts transition into the normal power mode. The main controller 5 outputs an ON signal (operation start signal RMT) to start the operation to the second converter 10b. In parallel to this, since the ON signal switches the switch Q2 to ON, the output voltage Vout1 turns the relay RL to ON. By the output voltage Vout1 driving the relay RL, the secondary side load of the first converter 10a is increased. For example, the power consumed by the secondary side is increased by about 0.5 W. As previously described, the output voltage Vout1 of the first converter 10a is fed back to the converter controller 4a. Therefore, when the secondary side load is increased, the duty ratio of the switching element Q1 is increased, and the output voltage Vout1 is maintained at the target voltage. When the duty ratio of the switching element Q1 increases, the electric power supplied to the secondary winding W2a of the transformer T1 increases, and the electric power supplied to the auxiliary winding W3 also increases. The voltage of the auxiliary winding W3 is in the uncontrolled state. Therefore, in a state where the load of the auxiliary winding W3 is constant, the voltage of the auxiliary winding W3 increases in proportion to the secondary side load.

Power supply voltage Vcc is supplied to the converter controller 4b at time t2. That is, at time t1, the ON signal (operation start signal RMT) is being output, but the timing at which the power supply voltage Vcc is supplied to the converter controller 4b is time t2. This is because the delay circuit 6 delays the operation start signal RMT. Here, although the operation start signal RMT input to the switch Q3 is delayed, the enable signal input from the main controller 5 or the like to the converter controller 4b may be delayed by the delay circuit 6.

As shown in FIG. 2, at time t2 as compared with time t1, the power supply capability of the auxiliary winding W3 is increased. This is because the relay RL is driven by the output voltage Vout1. As a result, from the time t2, it is possible to stably operate the second converter 10b.

Thus, by using the relay RL to increase the secondary side load of the first converter 10a, the need to provide a dummy resistor or the like on the secondary side of the transformer T1 is reduced. The time required to operate the relay RL is, for example, about several tens of milliseconds. Therefore, the delay of the startup time of the second converter 10b does not affect the operation of the device comprising the power supply apparatus 1.

The delay circuit 6 is a circuit for delaying output of an inputted signal. The delay time brought on by the delay circuit 6 is preset so that the second converter 10b starts operating after the relay RL starts operating.

The power supply apparatus 1 of the first embodiment includes the first converter 10a and the second converter 10b. However, the number of converters provided in the power supply apparatus 1 may be three or more. Electric power may also be supplied from the auxiliary winding W3 to two or more converter controllers. In any case, it is sufficient that the relay RL is driven at the output voltage Vout1 of the first converter 10a at time t1. Further, the delay circuit 6 is provided so that electric power is supplied to the two or more converter controllers from the auxiliary winding W3 at time t2.

In the first embodiment, an image forming apparatus was referred to as an example of an electric device, but the electric device is not limited thereto. Although the delay circuit 6 in FIG. 1 is provided on the primary side of the power supply apparatus 1 may be provided on the secondary side. For example, the delay circuit 6 may be provided between the main controller 5 and the photocoupler P3.

Second Embodiment

In the first embodiment, in order to operate the second converter 10b, the operation start signal RMT is an external signal from the main controller 5 was required. In the second embodiment, the operation start signal RMT for operating the second converter 10b is omitted. Incidentally, the first converter 10a need not be a sub power supply. The second converter 10b need not be a main power supply.

Figure 3:
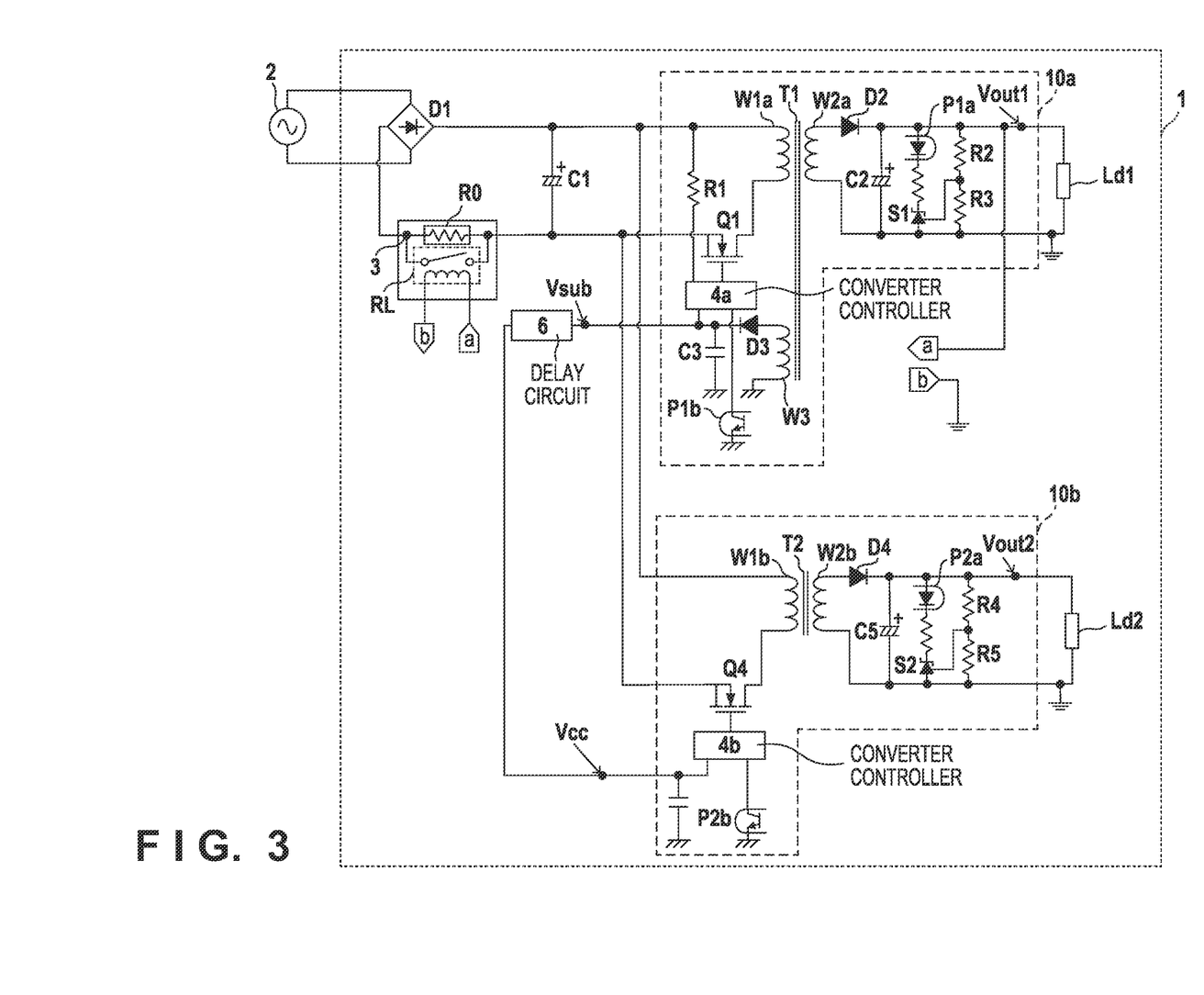
FIG. 3 is a circuit diagram of a power supply apparatus.

FIG. 3 shows the power supply apparatus 1 of the second embodiment. Of the circuit configuration shown in FIG. 3, the same reference numerals are given to the circuit configuration already described in FIG. 1, and the description thereof is omitted.

As shown in FIG. 3, a load Ld1 is connected to the first converter 10a. Further, in the power supply apparatus 1, the main controller 5 and the photocoupler P3 are not provided. Further, to the relay RL, the output voltage Vout1 is supplied directly. That is, the load Ld1 and the relay RL are connected in parallel to the first converter 10a. Furthermore, the switches Q2 and Q3 are also omitted in the power supply apparatus 1. The delay circuit 6 is disposed in the supply path of the voltage Vsub. That is, the delay circuit 6 directly delays the supply of the voltage Vsub.

Figure 4:
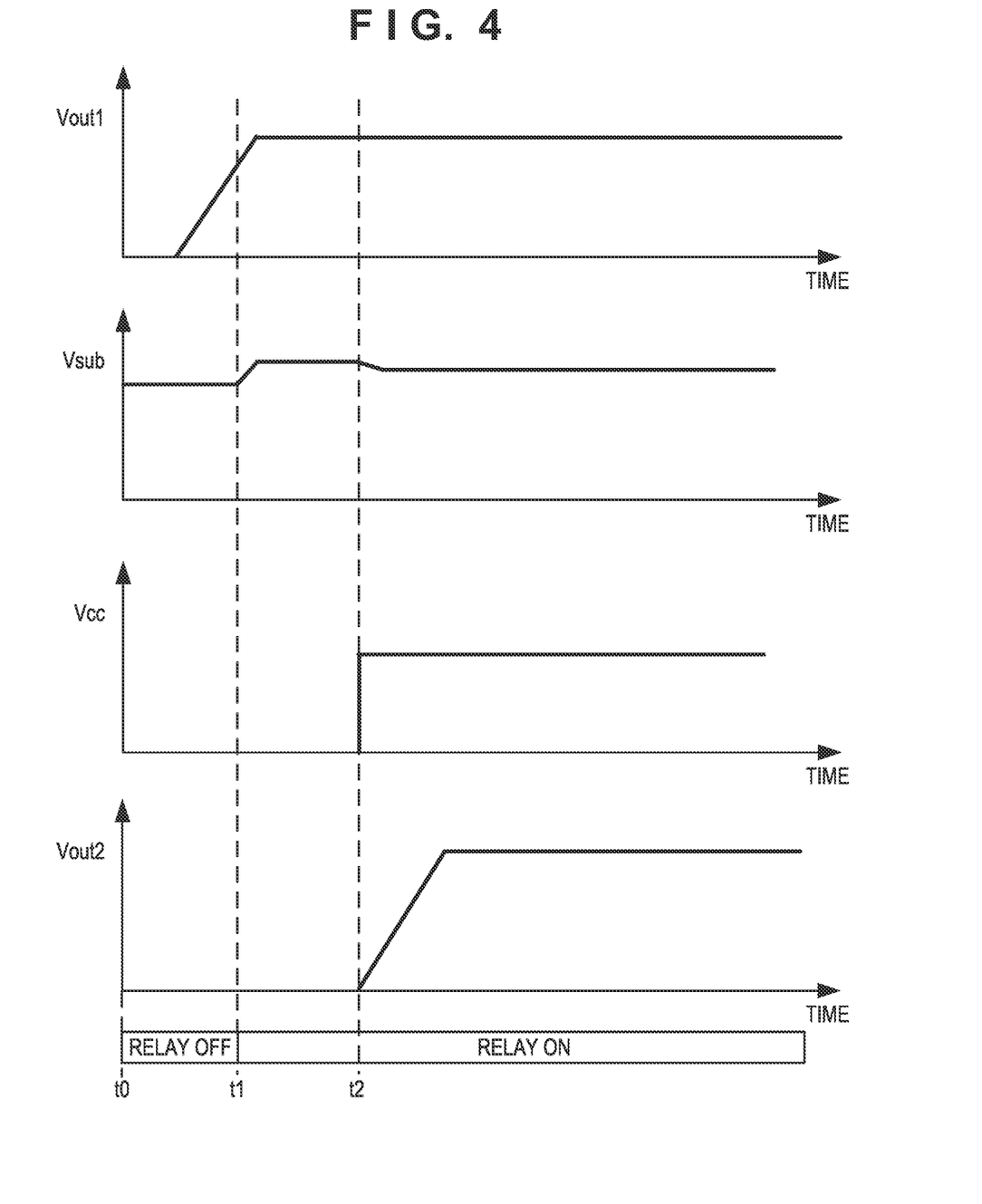
FIG. 4 is a timing chart illustrating voltage and signal change.

In FIG. 4, instead of the operation start signal RMT, the output voltage Vout1 is shown. At time t0, an alternating current voltage is inputted from the commercial power supply 2 to the power supply apparatus 1. Thereby, the capacitor C1 is charged. When the capacitor C1 is charged to a predetermined voltage, the first converter 10a starts operating. After the first converter 10a starts operation, the current limiting element R0 is not necessary. This is because when the charging of the capacitor C1 is completed, the inrush current does not flow to the capacitor C1. Therefore, the relay RL is short circuited in order to reduce the electric power loss at the current limiting element R0. Specifically, when the first converter 10a starts outputting the output voltage Vout1, the output voltage Vout1 is applied to the relay RL, the relay RL is turned on (a short circuit state (conductive state)). Since current bypasses the current limiting element R0, and flows through the relay RL, the current limiting element R0 ceases to consume electric power. In order to maintain the short circuit state of the relay RL, the output voltage Vout1 must continue to be applied to the relay RL. That is, the relay RL increases the load of the first converter 10a. Thereby, the power supply capability of the auxiliary winding W3 increases.

The power supply voltage Vcc is supplied to the converter controller 4b at time t2. Power supply voltage Vcc is a voltage generated by delaying the voltage Vsub by the delay circuit 6. At time t2, the relay RL increases the power supply capability from the auxiliary winding W3. Therefore, the second converter 10b operates stably by the power supply voltage Vcc. Thus, a relay RL is used to increase the secondary side load of the first converter 10a. Therefore, it is possible to increase the power supply capability of the auxiliary winding W3 without providing a dummy resistor on the secondary side.

Third Embodiment

Figure 5:
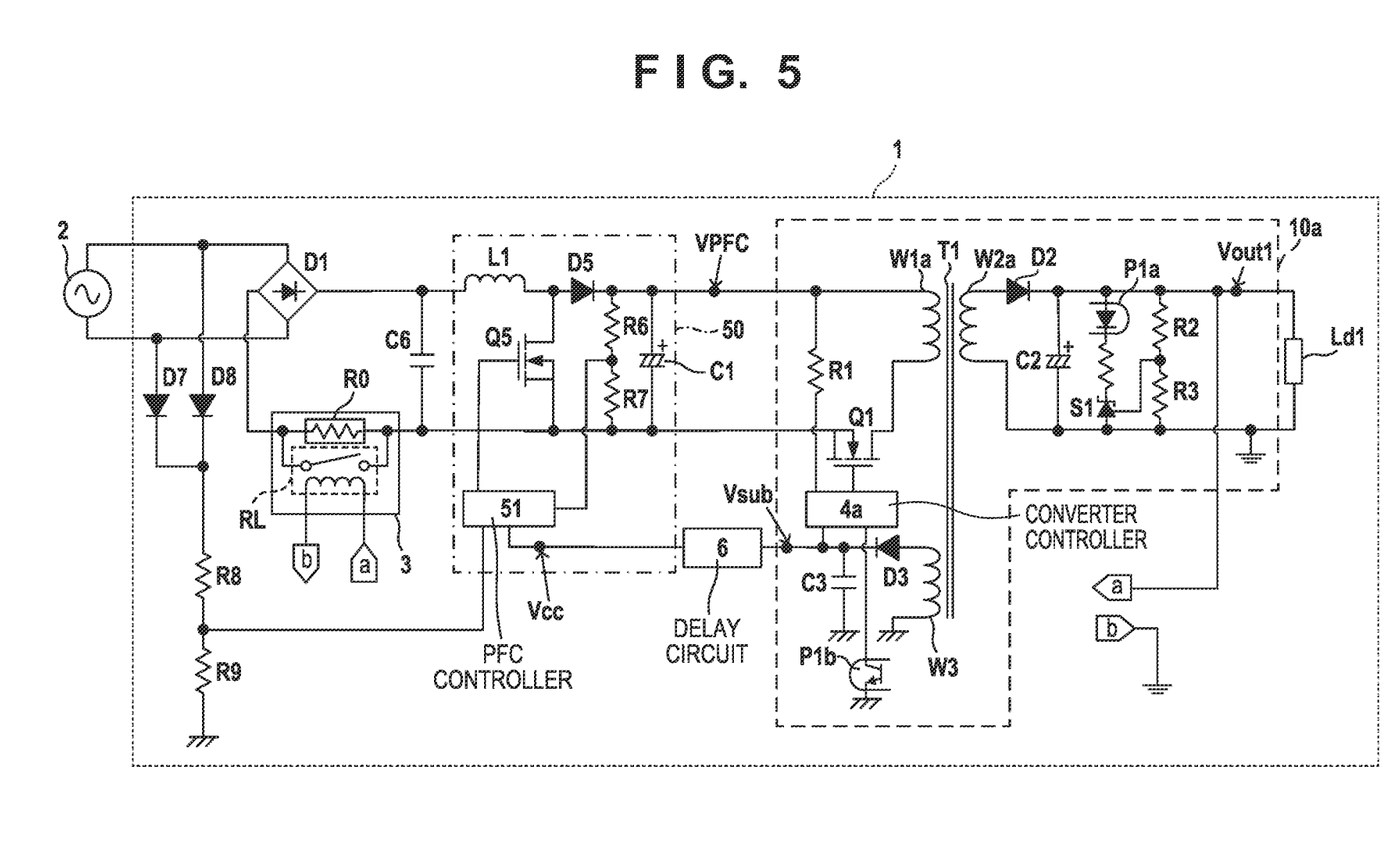
FIG. 5 is a circuit diagram of a power supply apparatus.

In the first embodiment and the second embodiment, the load of the auxiliary winding W3 was the converter controllers 4a and 4b. As shown in FIG. 5, a PFC controller 51 is used as a load of the auxiliary winding W3 in the third embodiment. In the third embodiment, the same reference numerals are assigned to the same items as those in the first and second embodiments, and a description thereof is omitted.

A PFC circuit 50 is a power factor correction circuit. A capacitor C6 for rectifying the pulsating current output from the diode bridge D1 is provided in the front stage of the PFC circuit 50. The PFC circuit 50 has a booster circuit composed of a coil L1, a diode D5, and a switching element Q5. One end of the coil L1 is connected to one end of the capacitor C6. The other end of the coil L1 is connected to the anode of the diode D5 and the drain of the switching element Q5. The cathode of the diode D5 is connected to one end of a resistor R6 and one end of the capacitor C1. The other end of the capacitor C6 is connected to the source of the switching element Q5, the other end of a resistor R7, and the other end of the capacitor C1. One end of the resistor R7 and the other end of the resistor R6 are connected to the detected voltage input terminal of the PFC controller 51. The gate of the switching element Q5 is connected to the control signal output terminal of the PFC controller 51.

The PFC circuit 50, while improving a power factor of the power supply apparatus 1 having a large input current, can reduce harmonics. To stabilize the output voltage (end-to-end voltage across the capacitor C1) VPFC of the PFC circuit 50, feedback control is employed. The output voltage VPFC is divided by the resistors R6 and R7, and converted into a detected voltage proportional to the output voltage VPFC. The detected voltage is inputted to the PFC controller 51. The PFC controller 51 compares the fed back detected voltage and the reference voltage. The PFC controller 51 detects the input voltage waveform using the diodes D7 and D8 and the resistors R8 and R9. The anode of the diode D7 is connected to the neutral side of the commercial power supply 2. The anode of a diode D8 is connected to the live side of the commercial power supply 2. The cathode of the diode D7 and the cathode of the diode D8 are connected to one end of a resistor R8. The other end of the resistor R8 and one end of a resistor R9 are connected to an input terminal of the PFC controller 51. The other end of the resistor R9 is grounded. Diodes D7 and D8 rectify the alternating current, respectively. The resistors R8 and R9 divide the voltage generated by the diodes D7 and D8 to generate an input voltage waveform, and output the input voltage waveform to the PFC controller 51. The PFC controller 51 controls the duty ratio of the control signal supplied to the gate of the switching element Q5 so that the deviation between the fed back detected voltage and the reference voltage decreases and the input current waveform becomes a sine wave similar to the input voltage waveform.

As shown in FIG. 5, the PFC controller 51 operates by supplying the voltage Vsub generated by the auxiliary winding W3, the capacitor C3, and the diode D3. Here, the voltage Vsub, delayed via the delay circuit 6, is supplied to the PFC controller 51.

Figure 6:
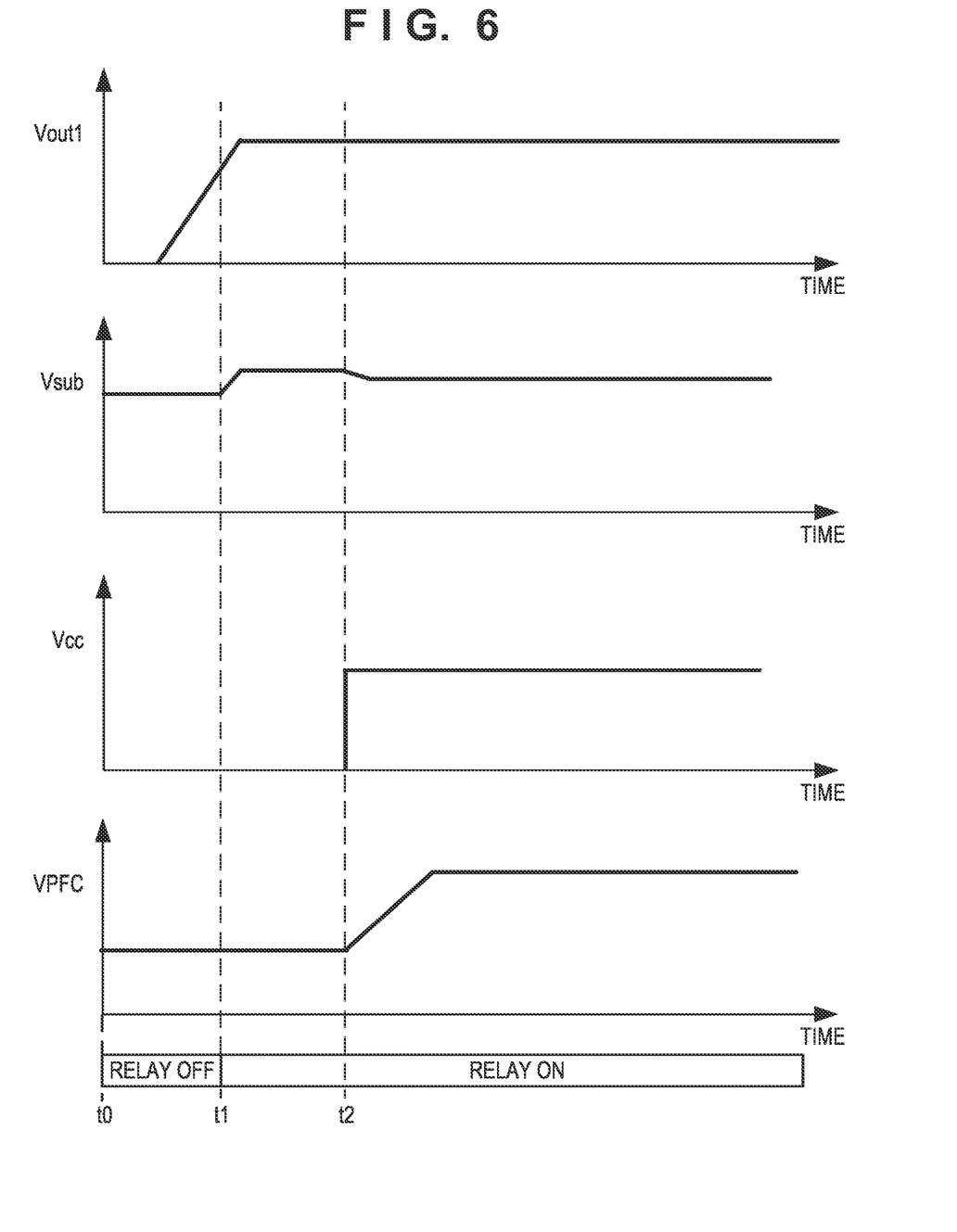
FIG. 6 is a timing chart illustrating voltage and signal change.

FIG. 6 is a voltage VPFC is shown in place of the output voltage Vout2. An alternating current voltage is inputted from the commercial power supply 2 to the power supply apparatus 1 at time t0. Thereby, the capacitor C1 is charged. When the capacitor C1 is charged to a predetermined voltage, the first converter 10a starts operating. After the first converter 10a starts operation, the current limiting element R0 is not necessary. This is because when the charging of the capacitor C1 is completed, the inrush current does not flow to the capacitor C1. Therefore, the relay RL is short circuited in order to reduce the electric power loss at the current limiting element R0. Specifically, when the first converter 10a starts outputting the output voltage Vout1, the output voltage Vout1 is applied to the relay RL, the relay RL is turned on (a short circuit state (conductive state)). Since current bypasses the current limiting element R0, and flows through the relay RL, the current limiting element R0 ceases to consume electric power. In order to maintain the short circuit state of the relay RL, the output voltage Vout1 must continue to be applied to the relay RL. The electric power consumed to drive the relay RL is, for example, about 0.5 W. That is, the relay RL increases the load of the first converter 10a. This increases the power supply capability of the auxiliary winding W3.

The power supply voltage Vcc is supplied to the PFC controller 51 at time t2. Power supply voltage Vcc is a voltage generated by delaying the voltage Vsub by the delay circuit 6. Thereby, the PFC controller 51 and the PFC circuit 50 start operation. The signal delayed by the delay circuit 6 may be an enable signal of the PFC controller 51.

At time t2, the relay RL increases the power supply capability from the auxiliary winding W3. Therefore, the PFC circuit 50 can be stably operated by the power supply voltage Vcc (voltage Vsub). Thus, because a relay RL is used to increase the secondary side load of the first converter 10a, the secondary side dummy resistor is unnecessary.

In the third embodiment, the first converter 10a and the PFC circuit 50 automatically start operating by an alternating current voltage being inputted to the power supply apparatus 1. However, operation and stoppage of the PFC circuit 50 may be switched by an external signal supplied from the main controller 5 of the electric device. For example, the PFC circuit 50 may stop when the electric device is set to a power saving mode. This reduces electric power loss. In the power saving mode, the input current supplied to the power supply apparatus 1 is small. Therefore, even if the PFC circuit 50 does not operate, the power factor and harmonics are not a problem. Similar to the first embodiment, when the electric device is in the power saving mode, the relay RL may be configured to stop operation. When the electric device transitions to the normal mode, the main controller 5 may output a signal to operate the PFC circuit 50. In this case, the main controller 5, by starting the operation of the relay RL, increases the power supply capability of the auxiliary winding W3. By the action of the delay circuit 6, the PFC circuit 50 can be operated stably by delaying the start of the PFC circuit 50 operation.

Although only the first converter 10a is described in the third embodiment, one or more converters may be further provided. In this case, the auxiliary winding W3 may provide electric power to the converter controller controlling one or more converters in addition to the PFC controller 51.

SUMMARY

[Aspect 1]

The diode bridge D1 is an example of a rectifier circuit for rectifying an alternating current inputted from an alternating power supply (e.g., the commercial power supply 2). The capacitor C1 is an example of a smoothing circuit for smoothing the output of the rectifier circuit. The inrush current reduction circuit 3 is an example of a protection circuit for protecting the rectifier circuit and the like from an inrush current inputted to the smoothing circuit. The relay RL is an example of a short-circuiting circuit that does not short circuit the protection circuit in a period in which an inrush current may occur, and does short circuit the protection circuit in a period in which an inrush current does not occur. The transformer T1 is an example of a transformer having a primary winding to which a primary side voltage generated by a smoothing circuit is applied, a secondary winding for generating a secondary side voltage corresponding to a predetermined winding ratio, and an auxiliary winding magnetically coupled to the primary winding to drive a load. The switching element Q1 is an example of a switching element for switching a current flowing through the primary winding so that the secondary side voltage becomes a target voltage. The diode D2 and the capacitor C2 function as a rectifying and smoothing circuit that rectifies and smoothes the secondary side voltage to generate an output voltage (e.g., Vout1). The short-circuiting circuit is driven by the output voltage (e.g., Vout1). This increases the secondary side load of the transformer and increases the power supply capability of the auxiliary winding. That is, the power supply capability of the auxiliary winding is stabilized without increasing the number of parts and cost.

The relay RL becomes a part of the load on the secondary side of the transformer T1. When the relay RL is turned on, the load on the secondary side of the transformer T1 increases. The result of this is an increase in the power supply capability of the auxiliary winding. For example, by the relay RL being turned on, the coil provided in the relay RL becomes part of the load on the secondary side of the transformer T1.

[Aspect 2]

The delay circuit 6 is an example of a delay circuit that delays the timing at which the operation of the load connected to the auxiliary winding is started with respect to the timing at which the operation of the short-circuiting circuit is started. This makes it possible to more reliably and stably start up the load. As shown in FIGS. 2, 4, and 6, a certain amount of time is required after the relay RL is actuated before the power supply capability of the auxiliary winding is sufficiently increased. Therefore, by the delay circuit 6 for this time or more delaying the operation start of the load, the load is started up stably.

[Aspect 3]

The main controller 5 functions as a control circuit for not supplying an output voltage to the short-circuiting circuit in a period in which the inrush current may occur, and supplying an output voltage to the short-circuiting circuit in a period in which the inrush current does not occur. Therefore, in a period where an inrush current may occur, the protection circuit is actuated. Meanwhile, in a period where an inrush current does not occur, the protection circuit is not actuated.

[Aspect 4]

The switch Q2 (e.g., semiconductor switch) is an example of a first switch for switching whether to supply the output voltage to the protection circuit in accordance with a signal output from the control circuit. The control circuit may start output of the signal when the operation of the short-circuiting circuit is started by the output voltage being supplied to the short-circuiting circuit. The first switch switches from OFF to ON based on the signal, and it may supply the output voltage to the protection circuit.

[Aspects 5 and 6]

The signal (e.g., ON signal) may also be used as a signal (e.g., RMT) to start up a load that operates by electric power generated by the auxiliary winding being provided thereto. The switch Q3 (e.g., a semiconductor switch) is an example of a second switch that operates to supply electric power generated by the auxiliary winding to a load when a signal is input.

[Aspect 7]

The delay circuit 6 delays the timing at which the signal is inputted to the second switch with respect to the timing at which the signal is inputted to the first switch. This delays the timing at which the operation of the load is started with respect to the timing at which the operation of the short-circuiting circuit is started.

[Aspect 8]

The photocoupler P3 is an example of a photocoupler provided between the control circuit and the second switch. The photocoupler P3 insulates the circuit group provided on the primary side of the transformer T1 from the circuit group provided on the secondary side of the transformer T1. The delay circuit 6 may be provided between the control circuit and the photocoupler, or between the photocoupler and the second switch.

[Aspects 9 and 11]

The load may be a controller (e.g., the converter controller 4b) for control a switching element to maintain a secondary side voltage at the target voltage. The PFC circuit 50 is an example of a power factor correction circuit connected to the primary side of the transformer T1. In this case, the load may be a controller (e.g., the PFC controller 51) for controlling the power factor correction circuit.

[Aspect 10]

The diode D3 and the capacitor C3 function as a generation circuit for generating a load voltage (e.g., Vsub, Vcc) to be supplied to the load, based on electric power generated in the auxiliary winding W3. The delay circuit 6 delays the timing at which the operation of the load is started with respect to the timing at which the operation of the short-circuiting circuit is started by delaying the timing at which the load voltage is supplied to the load.

[Aspect 12]

The delay circuit 6 may delay the timing at which the operation of the power factor correction circuit is started in relation to the timing at which the operation of the short-circuiting circuit is started.

[Aspect 13]

The diode D3 and the capacitor C3 function as a generation circuit for generating an operation voltage of a power factor correction circuit, based on electric power generated in the auxiliary winding W3. The delay circuit 6 delays the timing at which the operation of the power factor correction circuit is started with respect to the timing at which the operation of the short-circuiting circuit is started by delaying the timing at which the operation voltage is supplied to the power factor correction circuit.

[Aspect 14]

The protection circuit may have a resistance element that decreases an inrush current (e.g., the current limiting element R0). The short-circuiting circuit may have a relay RL connected in parallel to the resistance element. The relay RL does not short circuit the resistance element in a period in which an inrush current may occur, and does short circuit the resistance element in a period in which an inrush current does not occur. Relay RL is an example of a short-circuiting circuit. Therefore, other switch elements that have the same function as the relay RL, and consume the same electric power as the relay RL, and are capable of ensuring insulation between the primary and secondary may be employed.

[Aspect 15]

Figure 7:
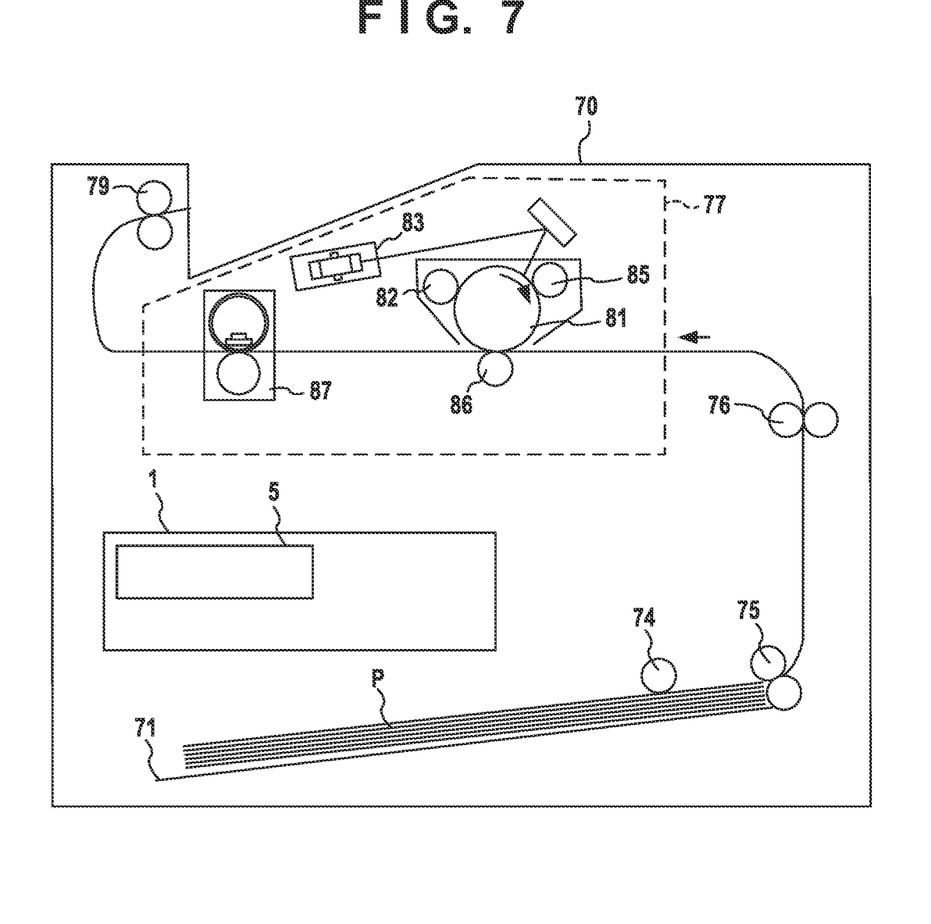
FIG. 7 is a schematic diagram of an image forming apparatus.

The image forming apparatus is an example of an electric device that operates by being supplied with an output voltage from the power supply apparatus. FIG. 7 shows an electrophotographic image forming apparatus 70. A sheet feeding cassette 71 is a storage unit for storing the recording material P. A sheet feeding roller 74 is a supply unit for feeding the recording material P to the conveying path and supplies the recording material P to an image forming unit 77. A conveyance roller pair 75 and a registration roller pair 76 for conveying the recording material P are provided in the conveying path. The image forming unit 77 is provided with a photosensitive drum 81 that carries an electrostatic latent image or a toner image. A charging roller 82 uniformly charges the surface of the photosensitive drum 81. An exposure unit 83 modulates a laser beam with an image signal corresponding to the input image, and deflects the laser beam. Thus, the laser beam scans the surface of the photosensitive drum 81, and an electrostatic latent image is formed. A developing roller 85 develops an electrostatic latent image using toner to form a toner image. A transfer roller 86 transfers the toner image conveyed by the photosensitive drum 81 onto the recording material P. A fixing device 87 applies heat and pressure to the toner image transferred to the recording material P while conveying the recording material P to fix the toner image to the recording material P. A discharge roller 79 discharges the recording material P on which the toner image is fixed by the fixing device 87.

The power supply apparatus 1 supplies a direct current voltage (e.g., Vout2) to motors that drive the photosensitive drum 81, the conveyance roller pair 75, the registration roller pair 76, and the discharge roller 79, and the like. The main controller 5 controls image formation by the image forming apparatus 70. The main controller 5 controls operation of the power supply apparatus 1 in accordance with whether the power mode of the image forming apparatus 70 is the normal mode or the power saving mode. The image forming unit 77 is an example of an image forming unit that operates by an output voltage being supplied from the power supply apparatus 1 and forms an image on the recording medium.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-000528, filed Jan. 6, 2020 which is hereby incorporated by reference herein in its entirety.

What is claimed is:

1. A power supply apparatus comprising:
a rectifier circuit configured to rectify alternating current inputted from an alternating power supply;
a smoothing circuit configured to smooth output of the rectifier circuit:
a protection circuit configured to protect the rectifier circuit from an inrush current inputted to the smoothing circuit;
a short-circuiting circuit configured to not short circuit the protection circuit in a period in which an inrush current may occur, and configured to short circuit the protection circuit in a period in which an inrush current does not occur;
a transformer having a primary winding to which a primary side voltage generated by the smoothing circuit is applied, a secondary winding for generating a secondary side voltage corresponding to a predetermined winding ratio, and an auxiliary winding magnetically coupled to the primary winding;
a delay circuit configured to delay a timing at which an operation of a load connected to the auxiliary winding is started with respect to an operation of a timing at which the short-circuiting circuit is started;
a switching element configured to switch a current that flows through the primary winding so that the secondary side voltage becomes a target voltage; and
a rectifying and smoothing circuit configured to generate an output voltage by rectifying and smoothing the secondary side voltage,
wherein the short-circuiting circuit is driven by the output voltage.

2. The power supply apparatus according to claim 1, further comprising:
a control circuit configured to not supply an output voltage to the short-circuiting circuit in a period in which the inrush current may occur, and configured to supply the output voltage to the short-circuiting circuit in a period in which the inrush current does not occur.

3. The power supply apparatus according to claim 2, further comprising:
a first switch configured to switch whether to supply the output voltage to the protection circuit in accordance with a signal outputted from the control circuit,
wherein the control circuit is configured to, when an operation of the short-circuiting circuit is started by the output voltage being supplied to the short-circuiting circuit, start output of the signal, and
the first switch is configured to switch from OFF to ON based on the signal and supply the output voltage to the protection circuit.

4. The power supply apparatus according to claim 3, wherein the signal is also used as a signal to start up the load that operates by providing electric power generated by the auxiliary winding.

5. The power supply apparatus according to claim 4, further comprising:
a second switch configured to operate so as to supply electric power generated by the auxiliary winding to the load when the signal is inputted.

6. The power supply apparatus according to claim 5, wherein the delay circuit is configured to, by delaying a timing at which the signal is inputted to the second switch with respect to a timing at which the signal is inputted to the first switch, delay a timing at which the operation of the load is started with respect to a timing at which the operation of the short-circuiting circuit is started.

7. The power supply apparatus according to claim 6, further comprising:
a photocoupler provided between the control circuit and the second switch, wherein the photocoupler insulates a circuit group provided on a primary side of the transformer from a circuit group provided on a secondary side of the transformer,
wherein the delay circuit is provided between the control circuit and the photocoupler, or between the photocoupler and the second switch.

8. The power supply apparatus according to claim 1, wherein a load connected to the auxiliary winding includes a controller that controls the switching element to maintain the secondary side voltage at the target voltage.

9. The power supply apparatus according to claim 2, further comprising:
a generation circuit configured to generate a load voltage supplied to the load based on electric power generated in the auxiliary winding, wherein the delay circuit further comprises a circuit that delays a timing at which the operation of the load is started with respect to a timing at which the operation of the short-circuiting circuit is started by delaying a timing at which the load voltage is supplied to the load.

10. The power supply apparatus according to claim 1, further comprising:
a power factor correction circuit connected to a primary side of the transformer,
wherein the load connected to the auxiliary winding includes a controller that controls the power factor correction circuit.

11. The power supply apparatus according to claim 10, wherein:
the delay circuit is further configured to delay a timing at which the operation of the power factor correction circuit is started with respect to a timing at which the operation of the short-circuiting circuit is started.

12. The power supply apparatus according to claim 11, further comprising:
a generation circuit configured to generate an operation voltage for the power factor correction circuit based on electric power generated in the auxiliary winding,
wherein the delay circuit is configured to delay a timing at which the operation of the power factor correction circuit is started with respect to a timing at which the operation of the short-circuiting circuit is started by delaying a timing at which the operation voltage is supplied to the power factor correction circuit.

13. The power supply apparatus according to claim 1, wherein
the protection circuit has a resistance element for decreasing the inrush current,
the short-circuiting circuit has a relay connected in parallel to the resistance element, and
the relay configured to not short circuit the resistance element in a period in which an inrush current may occur, and configured to short circuit the resistance element in a period in which an inrush current does not occur.

14. An image forming apparatus comprising:
a power supply apparatus; and
an image forming unit configured to operate by being supplied with an output voltage from the power supply apparatus, and form an image on a recording medium,
wherein the power supply apparatus comprises:
a rectifier circuit configured to rectify alternating current inputted from an alternating power supply;
a smoothing circuit configured to smooth output of the rectifier circuit:
a protection circuit configured to protect the rectifier circuit from an inrush current inputted to the smoothing circuit;
a short-circuiting circuit configured to not short circuit the protection circuit in a period in which an inrush current may occur, and configured to short circuit the protection circuit in a period in which an inrush current does not occur;
a transformer having a primary winding to which a primary side voltage generated by a smoothing circuit is applied, a secondary winding for generating a secondary side voltage corresponding to a predetermined winding ratio, and an auxiliary winding magnetically coupled to the primary winding;
a delay circuit configured to delay a timing at which an operation of a load connected to the auxiliary winding is started with respect to an operation of a timing at which the short-circuiting circuit is started;
a switching element configured to switch a current that flows through the primary winding so that the secondary side voltage becomes a target voltage; and
a rectifying and smoothing circuit configured to generate an output voltage by rectifying and smoothing the secondary side voltage,
wherein the short-circuiting circuit is driven by the output voltage.

15. A power supply apparatus comprising:
a rectifier circuit configured to rectify alternating current inputted from an alternating power supply;
a smoothing circuit configured to smooth output of the rectifier circuit:
a transformer having a primary winding to which a primary side voltage generated by the smoothing circuit is applied, a secondary winding for generating a secondary side voltage corresponding to a predetermined winding ratio, and an auxiliary winding magnetically coupled to the primary winding;
a switching element configured to switch a current that flows through the primary winding so that the secondary side voltage becomes a target voltage;
a rectifying and smoothing circuit configured to generate an output voltage by rectifying and smoothing the secondary side voltage; and
a relay, provided on a primary side of the transformer and configured to be driven by the output voltage, and which becomes a part of a load of a secondary side of the transformer,
wherein in a case where the relay becomes on by the output voltage being used as a voltage for turning the relay on, the load of the secondary side of the transformer increases, and a power supply capability of the auxiliary winding increases thereby.

16. The power supply apparatus according to claim 15, wherein by the relay becoming on, a coil arranged in the relay becomes a part of the load of the secondary side of the transformer.

17. The power supply apparatus according to claim 15, wherein the relay is connected in series to one end of the primary winding of the transformer.

* * * * *